United States Patent
Nishi et al.

(10) Patent No.: US 8,248,033 B2
(45) Date of Patent: Aug. 21, 2012

(54) SECONDARY BATTERY TEMPERATURE-INCREASING CONTROL APPARATUS AND VEHICLE INCLUDING THE SAME, AND SECONDARY BATTERY TEMPERATURE-INCREASING CONTROL METHOD

(75) Inventors: Yuji Nishi, Nagoya (JP); Hidenori Takahashi, Okazaki (JP); Masatoshi Tazawa, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/382,672

(22) PCT Filed: Jul. 7, 2010

(86) PCT No.: PCT/IB2010/001669
§ 371 (c)(1),
(2), (4) Date: Jan. 6, 2012

(87) PCT Pub. No.: WO2011/004250
PCT Pub. Date: Jan. 13, 2011

(65) Prior Publication Data
US 2012/0112695 A1      May 10, 2012

(30) Foreign Application Priority Data
Jul. 8, 2009   (JP) .................................. 2009-161924

(51) Int. Cl.
*H01M 10/46*         (2006.01)
(52) U.S. Cl. ........................................ 320/132; 320/150
(58) Field of Classification Search .................. 320/109, 320/128, 132, 137, 150, 160, 161, 162
See application file for complete search history.

(56) References Cited

U.S. PATENT DOCUMENTS

| | | | |
|---|---|---|---|
| 4,554,500 A * | 11/1985 | Sokira | 320/139 |
| 6,271,648 B1 | 8/2001 | Miller | |
| 6,646,415 B1 * | 11/2003 | Nebrigic et al. | 320/107 |
| 2003/0102845 A1 * | 6/2003 | Aker et al. | 320/139 |

FOREIGN PATENT DOCUMENTS

| | | |
|---|---|---|
| DE | 100 40 198 A1 | 3/2001 |
| EP | 1 286 459 A1 | 2/2003 |
| JP | 11-329516 A | 11/1999 |
| JP | 2006-006073 A | 1/2006 |
| JP | 2008-061487 A | 3/2008 |
| JP | 2009-142069 A | 6/2009 |

OTHER PUBLICATIONS

International Search Report and Written Opinion for corresponding International Patent Application No. PCT/IB2010/001669 mailed Apr. 12, 2011.
Japanese Office Action for corresponding JP Patent Application No. 2009-161924 drafted Jun. 17, 2011.

* cited by examiner

*Primary Examiner* — Edward Tso
(74) *Attorney, Agent, or Firm* — Sughrue Mion, PLLC

(57) ABSTRACT

An ECU determines whether the ripple current is within a target range (S50). When it is determined that the ripple current is not within the target range (NO in S50), the ECU determines whether the ripple current is greater than or less than the target range (S80). When it is determined that the ripple current is less than the target range (NO in S80), the ECU reduces the carrier frequency of the boost converter that is a component of the ripple generating section (S90). On the other hand, when it is determined that the ripple current is greater than the target range (YES in S80), the ECU increases the carrier frequency of the boost converter (S100).

10 Claims, 9 Drawing Sheets

SECONDARY BATTERY TEMPERATURE-INCREASING CONTROL APPARATUS AND VEHICLE INCLUDING THE SAME, AND SECONDARY BATTERY TEMPERATURE-INCREASING CONTROL METHOD

BACKGROUND OF THE INVENTION

1. Field of the Invention

The invention relates to a secondary battery temperature-increasing control apparatus and a vehicle including the same and to a secondary battery temperature-increasing control method. In particular, the invention relates to a technology for performing temperature increasing control to increase the temperature of the secondary battery with the use of the heat generation caused by the internal resistance of the secondary battery.

2. Description of the Related Art

In general, in secondary batteries, typified by lithium-ion batteries and nickel-hydrogen batteries, charging and discharging characteristics are degraded as the temperature decreases. When the temperature of the battery is low, it is required to quickly increase the temperature of the battery.

Japanese Patent Application Publication No. H11-329516 (JP-A-11-329516) describes an apparatus for increasing the temperature of a battery. In the temperature increasing apparatus, a resonance circuit is formed by connecting a series circuit consisting of an inductor, a capacitor, and an alternating-current power supply across the battery. The temperature of the battery is increased by making the alternating-current power supply generate an alternating current voltage at the resonance frequency of the resonance circuit.

In the temperature increasing apparatus, almost all the electric power is consumed in the internal resistance during resonance and the temperature of the battery is increased by self-heat generation. It is insisted that this temperature increasing apparatus is capable of effectively increasing the temperature of the battery with minimum electric power consumption (see JP-A-11-329516).

In general, it is required of secondary batteries to conform to the requirements of the upper and lower limit voltages of the batteries in view of safety and durability. However, JP-A-11-329516 merely discloses the technology for increasing the temperature of the battery and the above publication includes no discussion concerning how the temperature is efficiently increased within the range, in which the voltage does not exceed the upper limit voltage nor fall below the lower limit voltage.

The electric current generated by the resonance circuit is affected by the unevenness of the inductance L and/or the characteristics of the battery and the amount of heat generated in the battery is proportional to the square of the peak value of the electric current caused to flow by the resonance circuit. Thus, the amount of heat generated in the battery is significantly affected by the unevenness of the inductance L and/or the characteristics of the battery. The above publication, however, includes no discussion concerning any measure against such unevenness of the amount of heat generated.

SUMMARY OF THE INVENTION

The invention provides a secondary battery temperature-increasing control apparatus for efficiently generating a target amount of heat within the range, in which the voltage of a secondary battery does not exceed the upper limit voltage of the secondary battery nor fall below the lower limit voltage thereof, and provides a vehicle including such a secondary battery temperature-increasing control apparatus.

The invention also provides a secondary battery temperature-increasing control method of efficiently generating a target amount of heat within the range, in which the voltage of a secondary battery does not exceed the upper limit voltage of the secondary battery nor fall below the lower limit voltage thereof.

A secondary battery temperature-increasing control apparatus according to a first aspect of the invention is the secondary battery temperature-increasing control apparatus for increasing a temperature of a secondary battery by controlling a ripple generating section configured to actively cause a ripple current to flow in the secondary battery. The secondary battery temperature-increasing control apparatus includes an electric current detecting section, a voltage detecting section, and a feed back control section. The electric current detecting section detects an electric current charging or discharging the secondary battery. The voltage detecting section detects a voltage of the secondary battery. The feed back control section controls the ripple generating section so that the ripple current detected by the electric current detecting section is brought to a predetermined target while the voltage detected by the voltage detecting section is restricted between predetermined upper and lower limits.

In the above first aspect, a configuration may be employed, in which when the ripple current is less than the target, the feed back control section controls the ripple generating section so that the frequency of the ripple current is reduced, and when the ripple current is greater than the target, the feed back control section controls the ripple generating section so that the frequency of the ripple current is increased.

In the above first aspect, a configuration may be employed, in which the ripple generating section includes a chopper-type booster configured to be capable of boosting an output voltage of the booster to or above the voltage of the secondary battery, the feed back control section reduces a carrier frequency of the booster when the ripple current is less than the target, and the feed back control section increases the carrier frequency of the booster when the ripple current is greater than the target.

In the above first aspect, a configuration may be employed, in which the ripple generating section includes a chopper-type booster configured to be capable of boosting an output voltage of the booster to or above the voltage of the secondary battery, the feed back control section increases a boost ratio of the booster when the ripple current is less than the target, and the feed back control section reduces the boost ratio of the booster when the ripple current is greater than the target.

In the above first aspect, the secondary battery temperature-increasing control apparatus may further include a temperature detecting section and a state of charge (SOC) estimating section. The temperature detecting section detects the temperature of the secondary battery. The SOC estimating section estimates an SOC of the secondary battery. In this case, the feed back control section stops controlling the ripple generating section when the temperature detected by the temperature detecting section reaches a first predetermined value or when the SOC estimated by the SOC estimating section reaches a second predetermined value.

A vehicle according to a second aspect of the invention includes a secondary battery, a ripple generating section, and the secondary battery temperature-increasing control apparatus according to the first aspect. The secondary battery stores electric power for driving the vehicle. The ripple generating section is connected to the secondary battery and is configured to actively cause a ripple current to flow in the secondary battery. The secondary battery temperature-increasing control apparatus increases the temperature of the secondary battery by controlling the ripple generating section.

A secondary battery temperature-increasing control method according to a third aspect of the invention is the secondary battery temperature-increasing control method of increasing the temperature of a secondary battery by controlling a ripple generating section configured to actively cause a ripple current to flow in the secondary battery, the secondary battery temperature-increasing control method including: determining whether the ripple current has been brought to a predetermined target; and when it is determined that the ripple current has not been brought to the target, determining whether the ripple current is greater than or less than the target. The secondary battery temperature-increasing control method further includes: when it is determined that the ripple current is less than the target, controlling the ripple generating section so that the frequency of the ripple current is reduced; and when it is determined that the ripple current is greater than the target, controlling the ripple generating section so that the frequency of the ripple current is increased.

In the third aspect of the invention, a configuration may be employed, in which the ripple generating section includes a chopper-type booster configured to be capable of boosting an output voltage of the booster to or above the voltage of the secondary battery, and the secondary battery temperature-increasing control method further includes: when the ripple current is less than the target, reducing a carrier frequency of the booster; and when the ripple current is greater than the target, increasing the carrier frequency of the booster.

In the third aspect of the invention, a configuration may be employed, in which the ripple generating section includes a chopper-type booster configured to be capable of boosting an output voltage of the booster to or above the voltage of the secondary battery, and the secondary battery temperature-increasing control method further includes: when the ripple current is less than the target, increasing a boost ratio of the booster; and when the ripple current is greater than the target, reducing the boost ratio of the booster.

In the third aspect of the invention, the secondary battery temperature-increasing control method may further include: detecting the temperature of the secondary battery; estimating a state of charge (SOC) of the secondary battery; and when the detected temperature reaches a first predetermined value or when the estimated SOC reaches a second predetermined value, stopping controlling the ripple generating section.

In the invention, the temperature of the secondary battery is increased by controlling the ripple generating section that is configured to actively cause the ripple current to flow in the secondary battery. Even when there is unevenness in the circuit constant of the ripple generating section and the characteristics of the secondary battery, it is possible to generate the maximum ripple current within the range, in which the voltage of the secondary battery is restricted between the predetermined upper and lower limits because the ripple generating section is controlled so that the ripple current is brought to a predetermined target while the voltage of the secondary battery is restricted between the predetermined upper and lower limits.

Thus, according to the invention, the target amount of heat is efficiently generated within the range, in which the voltage of the secondary battery does not exceed the upper limit voltage nor fall below the lower limit voltage.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
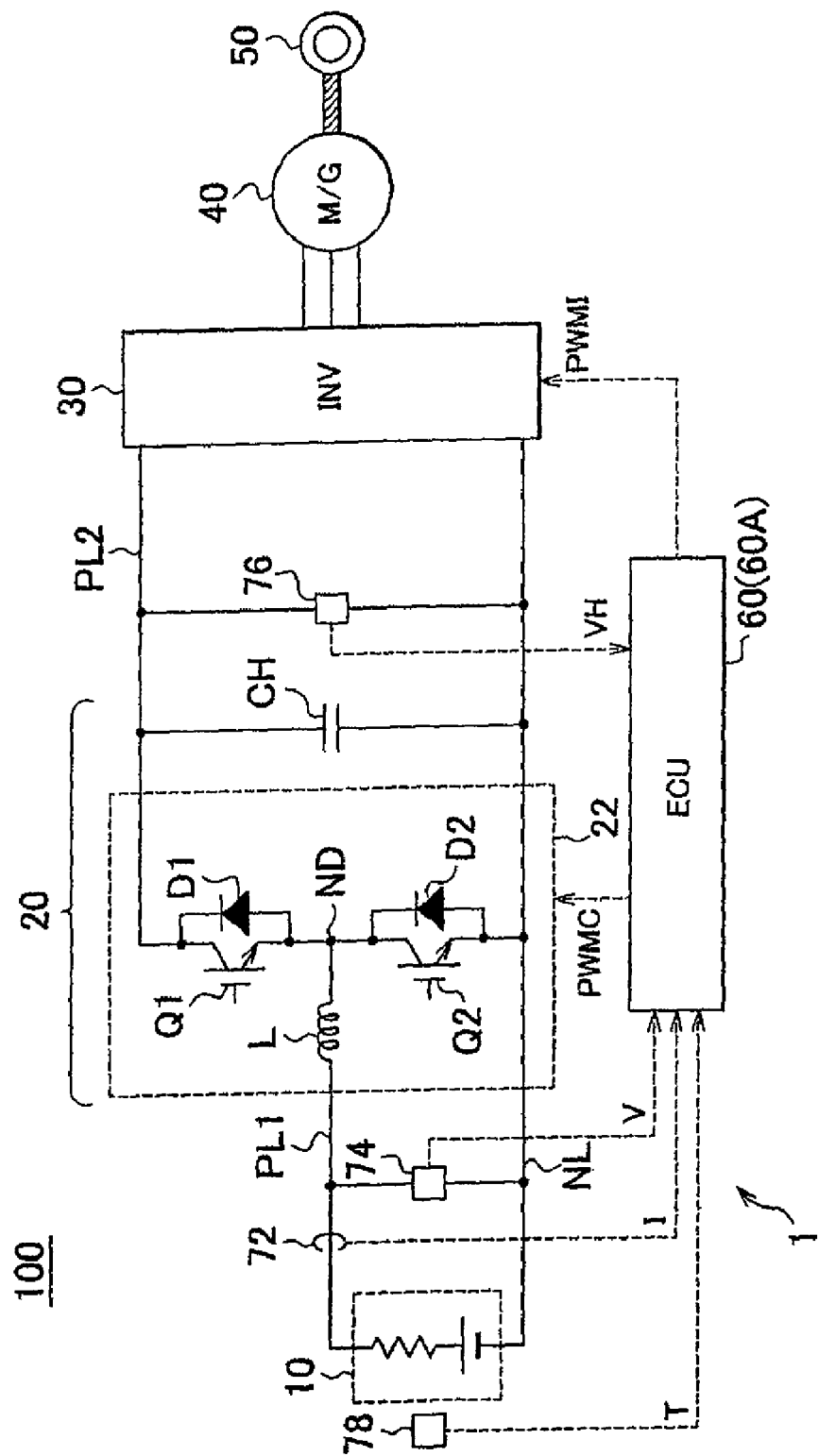
FIG. 1 is a block diagram of the whole of an electric vehicle that is given as an application example of a secondary battery temperature-increasing control apparatus according to a first embodiment of the invention.

Embodiments of the invention will be described in detail below with reference to drawings. Note that the same or the corresponding portions in the drawings are designated by the same reference numeral and the description thereof is not repeated.

(First Embodiment)

FIG. 1 is a block diagram of the whole of an electric vehicle that is given as an application example of a secondary battery temperature-increasing control apparatus 1 according to a first embodiment of the invention. Referring to FIG. 1, the electric vehicle 100 includes the secondary battery 10, a boost converter 22, a capacitor CH, an inverter 30, a motor generator 40, and a driving wheel 50. The electric vehicle 100 further includes an electronic control unit (ECU) 60, an electric current sensor 72, voltage sensors 74 and 76, and a temperature sensor 78.

The secondary battery 10 is a rechargeable battery, typified by a lithium ion battery or a nickel-hydrogen battery. A positive terminal and a negative terminal of the secondary battery 10 are connected to a positive line PL1 and a negative line NL, respectively.

The boost converter 22 includes power semiconductor switching devices (hereinafter also referred to merely as "the switching devices") Q1 and Q2, diodes D1 and D2, and a reactor L. The switching devices Q1 and Q2 are connected in series between a positive line PL2 and the negative line NL. A collector of the switching device Q1 is connected to the positive line PL2 and an emitter of the switching device Q2 is connected to the negative line NL. The diodes D1 and D2 are connected in anti-parallel to the switching devices Q1 and Q2, respectively. One terminal of the reactor L is connected to the positive line PL1 and the other terminal thereof is connected to a node ND between the switching devices Q1 and Q2.

As the above switching devices Q1 and Q2, insulated gate bipolar transistors (IGBTs), power metal oxide semiconductor (MOS) transistors, etc. can be used, for example.

The boost converter 22 can boost the voltage between the positive line PL2 and the negative line NL (hereinafter also referred to as "the system voltage") to or above the output voltage of the secondary battery 10, based on a control signal PWMC from the ECU 60. When the system voltage is lower than the desired voltage, by increasing the duty factor of the switching device Q2, an electric current is caused to flow from the positive line PL1 to the positive line PL2, so that it is possible to raise the system voltage. Meanwhile, when the system voltage is higher than the desired voltage, by increasing the duty factor of the switching device Q1, an electric current is caused to flow from the positive line PL2 to the positive line PL1, so that it is possible to reduce the system voltage.

The boost converter 22 and the capacitor CH form a ripple generating section 20 to be described later. The boost converter 22 actively causes a ripple current to flow in the secondary battery 10 based on the control signal PWMC from the ECU 60, thereby increasing the temperature of the secondary battery 10 from its inside (such an operation for increasing temperature is hereinafter also referred to as "the ripple temperature increase operation"). Specifically, in the boost converter 22, the switching devices Q1 and Q2 are complementarily turned on and off according to the control signal PWMC from the ECU 60, whereby the boost converter 22 causes a ripple current to flow in the secondary battery 10 depending on the switching frequency of the switching devices Q1 and Q2. The ripple temperature increase operation will be described in detail later.

The capacitor CH is connected between the positive line PL2 and the negative line NL to smooth the voltage between the positive line PL2 and the negative line NL. The capacitor CH is used as an electric power buffer that temporarily stores the electric power output from the secondary battery 10 when the ripple temperature increase operation on the secondary battery 10 is performed.

The inverter 30 converts the direct-current power supplied from the positive line PL2 and the negative line NL into three-phase alternating current based on the control signal PWMI from the ECU 60 and outputs the three-phase alternating current to the motor generator 40 to drive the motor generator 40. The inverter 30 converts the three-phase alternating current generated by the motor generator 40 into a direct current based on the control signal PWMI to output the direct current to the positive line PL2 and the negative line NL during braking of the vehicle.

The motor generator 40 is an alternating current motor, which is, for example, a three-phase alternating current motor provided with a rotor, in which permanent magnets are embedded. The motor generator 40 is mechanically connected to the driving wheel 50 and generates the torque for driving the vehicle. In addition, the motor generator 40 receives the kinetic energy of the vehicle from the driving wheel 50 to generate electricity during braking of the vehicle.

The electric current sensor 72 detects an electric current I input and output to and from the secondary battery 10 and the detected value is output to the ECU 60. The sign of the electric current I is hereinafter positive when the electric current I flows in the direction such that the secondary battery 10 is charged. The electric voltage sensor 74 detects an electric voltage V between the positive line PL1 and the negative line NL that corresponds to the output voltage of the secondary battery 10, and outputs the detected value to the ECU 60. The voltage sensor 76 detects a voltage VH between the positive line PL2 and the negative line NL and outputs the detected value to the ECU 60. The temperature sensor 78 detects the temperature T of the secondary battery and outputs the detected value to the ECU 60.

The ECU 60 generates a pulse width modulation (PWM) signal for driving the boost converter 22 based on the detected values of the voltages V and VH supplied from the voltage sensors 74 and 76, respectively. The generated PWM signals are output to the boost converter 22 as the control signal PWMC.

When predetermined conditions for performing the ripple temperature increase operation on the secondary battery 10 are satisfied, the ECU 60 generates the control signal PWMC for causing a ripple current at a predetermined frequency to flow in the secondary battery 10 and the generated control signal PWMC is output to the boost converter 22. As an example, the ECU 60 sets the frequency of the carrier signal to the predetermined frequency (hereinafter also referred to as "the ripple frequency") and generates the control signal PWMC for turning on and off the switching devices Q1 and Q2 of the boost converter 22 at the ripple frequency.

In addition, the ECU 60 generates the control signal PWMC so that the voltage V detected by the voltage sensor 74 is restricted within the range between the predetermined upper and lower limits and the ripple current detected by the electric current sensor 72 reaches the predetermined target, by adjusting the frequency of the ripple current (hereinafter also referred to as "the ripple frequency").

The ripple temperature increase operation on the secondary battery 10 by the ripple generating section 20 formed of the boost converter 22 and the capacitor CH and control to increase the temperature of the secondary battery 10 based on the detected values of the electric current I and the voltage V during the ripple temperature increase operation, will be described in detail later.

The ECU 60 generates the control signal PWMI for driving the motor generator 40 and outputs the generated control signal PWMI to the inverter 30.

Figure 2:
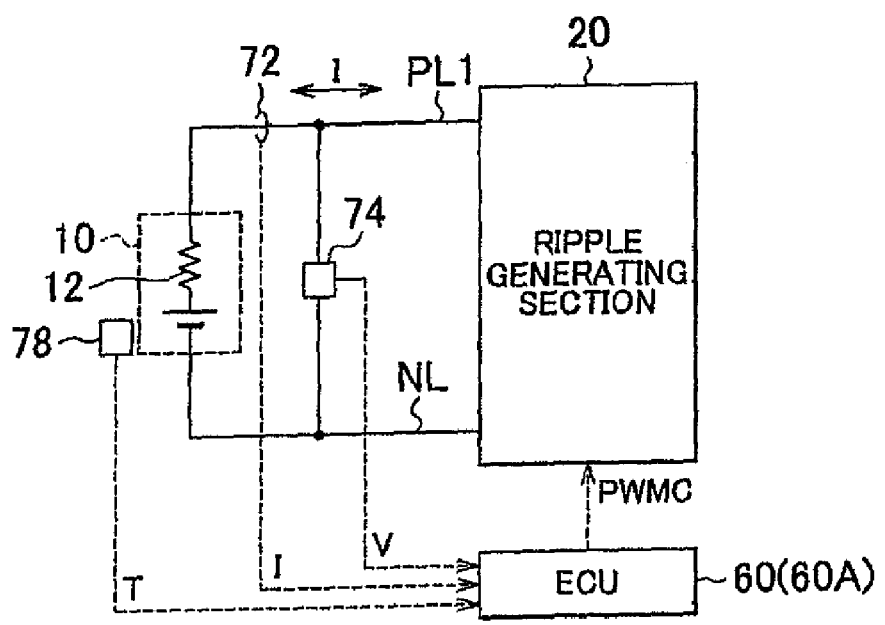
FIG. 2 is a diagram showing a system configuration of part of the electric vehicle shown in FIG. 1, the part relating to ripple temperature increase operation on the secondary battery.

FIG. 2 is a diagram showing a system configuration of part of the electric vehicle 100 shown in FIG. 1, the part relating to the ripple temperature increase operation on the secondary battery 10. Referring to FIG. 2, the secondary battery 10 includes an internal resistance 12. The internal resistance 12 has a temperature dependence and significantly varies depending also on the frequency of the electric current that flows in the battery as described later.

The ripple generating section 20 is, as described above, formed of the boost converter 22 and the capacitor CH shown in FIG. 1 (not shown in FIG. 2). In the ripple generating section 20, the switching devices Q1 and Q2 (not shown in FIG. 2) are complementarily turned on and off according to the control signal PWMC from the ECU 60, whereby the ripple generating section 20 generates the ripple current depending on the switching frequencies of the switching devices Q1 and Q2.

A brief description of the ripple temperature increase operation will be provided below and then, the configuration of the ECU 60 that performs the temperature increasing control of the secondary battery 10 will be described in detail.

(Brief Description of Ripple Temperature Increase Operation)

Figure 3:
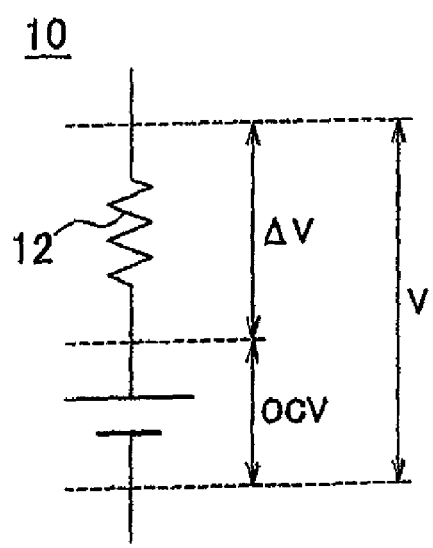
FIG. 3 is a diagram showing a breakdown of the voltage of the secondary battery.

FIG. 3 is a diagram showing a breakdown of the voltage of the secondary battery 10. In FIG. 3, for the sake of simplicity, the internal resistance has the real part only and there is no imaginary part caused by L, C etc. Referring to FIG. 3, the voltage V generated between the terminals of the secondary battery 10 is obtained by adding or subtracting a voltage $\Delta V$, generated across the internal resistance 12 during energization, to or from an open-circuit voltage, OCV. Specifically, V=OCV+$\Delta V$ when the charging electric current flows, and V=OCV−$\Delta V$ when the discharging electric current flows ($\Delta V>0$).

When the resistance value of the internal resistance 12 is R, the amount of heat Q generated when an electric current I flows in the secondary battery 10 is expressed by the following equation:

$$Q = I^2 \times R \quad (1)$$
$$= I \times \Delta V \quad (2)$$
$$= \Delta V^2 / R \quad (3)$$

These equations (1) to (3) are equivalent to each other. According to the equation (1), it seems that the temperature of the secondary battery 10 is effectively increased by increasing the ripple current I generated with the use of the ripple generating section 20. In actuality, however, with regard to the voltage V of the secondary battery 10, it is required to conform to the upper and lower limit voltage in view of the safety and the durability. In particular, under extremely low temperature conditions, the resistance value R of the internal resistance 12 increases and the voltage $\Delta V$ therefore increases, so that there is a possibility that a situation occurs where it becomes impossible to cause a sufficient ripple current I for generating heat to flow while the voltage V of the secondary battery 10 is restrained within the range between the upper and lower limits.

Specifically, under low temperature conditions (especially under extremely low temperature conditions), in which the resistance value R of the internal resistance 12 increases, there is a possibility that a situation occurs where the voltage $\Delta V$ becomes a restriction and makes it impossible to cause the ripple current I to flow in the secondary battery 10, which prevents the temperature of the secondary battery 10 from being effectively increased. Thus, focus is put on the equation (3) and the frequency characteristics of the impedance of the secondary battery 10 and the ripple current at a frequency within the range, in which the absolute value of the impedance of the secondary battery 10 (resistance value R of the internal resistance 12) is relatively lower as compared to the absolute value of the same impedance in the case of the frequency out of this rang; is caused to flow by the ripple generating section 20. In this way, the heat generation amount Q in the secondary battery 10 increases and it becomes possible to effectively increase the temperature of the secondary battery 10.

Figure 4:
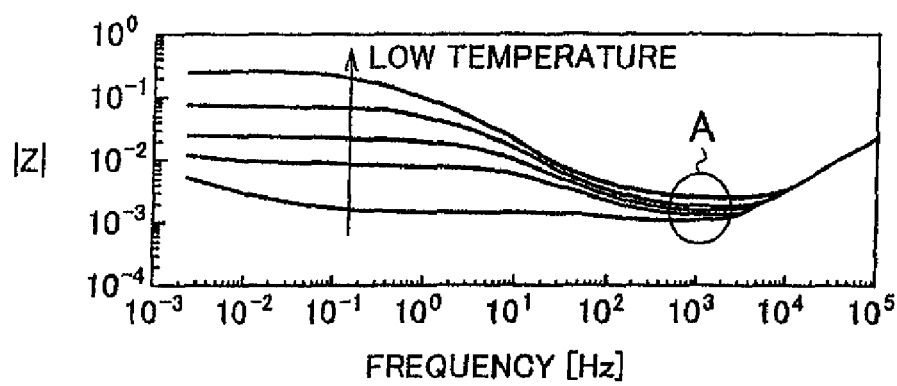
FIG. 4 is a Bode diagram showing impedance characteristics (absolute value) of the secondary battery.
Figure 5:
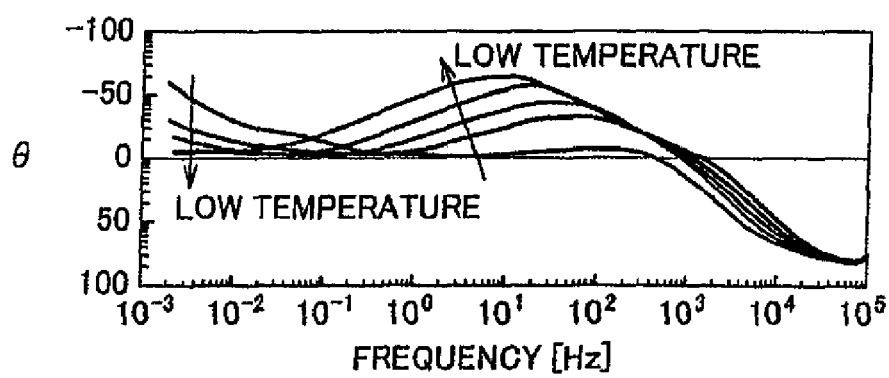
FIG. 5 is a Bode diagram showing impedance characteristics (phase) of the secondary battery.

FIGS. 4 and 5 are Bode diagrams showing the impedance characteristics of the secondary battery 10. As a method of analyzing the electrical characteristics of the secondary battery, the electrochemical impedance spectroscopy (EIS) is known. The Bode diagrams show the impedance characteristics of the secondary battery 10 with the use of the EIS. FIG. 4 shows the frequency characteristics of the absolute value |Z| of the impedance Z. FIG. 5 shows the frequency characteristics of the phase $\theta$ of the impedance Z.

In FIGS. 4 and 5, the horizontal axis, which is graduated logarithmically, indicates the frequency of the alternating current (ripple current) generated in the secondary battery 10. The vertical axis, which is graduated logarithmically, indicates the absolute value |Z| of the impedance Z in FIG. 4. The vertical axis indicates the phase $\theta$ of the impedance Z in FIG. 5.

As shown in FIG. 4, under low temperature conditions, in which it is required to increase the temperature of the secondary battery 10, the absolute value |Z| of the impedance Z increases as compared to that under non-low temperature conditions. However, such increase is significant when the frequency of the ripple current is low. In particular, around the frequency of 1 kHz, the absolute value |Z| of the impedance Z is smaller than that when the frequency is away from such a frequency range (around 1 kHz). In addition, even under extremely low temperature conditions, the absolute value is at most three times as high as that under the non-low temperature conditions (at room temperature, for example) (portion A in FIG. 4). In addition, as shown in FIG. 5, in such a frequency range (around 1 kHz), the phase $\theta$ of the impedance Z is near zero and therefore, the power factor is 1, which means good efficiency.

Thus, based on the frequency characteristics of the impedance of the secondary battery 10, the ripple current at a frequency within the range (around 1 kHz based on FIG. 4, for example), in which the absolute value |Z| of the impedance Z of the secondary battery 10 is relatively low, is generated by the ripple generating section 20. In this way, it is possible to effectively cause the ripple current to flow in the secondary battery 10 even under the restriction imposed by the voltage $\Delta V$ generated across the internal resistance 12 of the secondary battery 10, so that the temperature of the secondary battery 10 is effectively increased.

Figure 6:
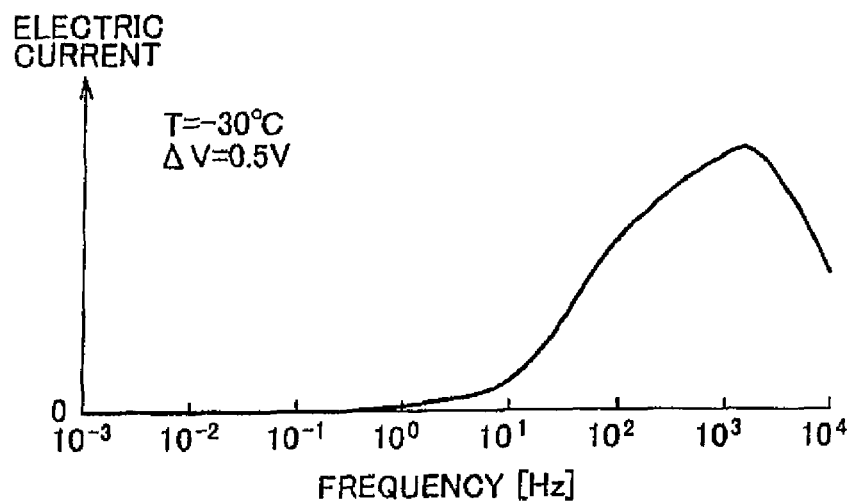
FIG. 6 is a diagram showing a peak value of a ripple current that can be caused to flow in the secondary battery under extremely low temperature conditions, where the voltage generated across an internal resistance of the secondary battery is a constraint.

FIG. 6 is a diagram showing the peak value of the ripple current that can be caused to flow in the secondary battery 10 under extremely low temperature conditions, where the voltage $\Delta V$ generated across the internal resistance 12 of the secondary battery 10 is a constraint. Referring to FIG. 6, the horizontal axis indicates the frequency of the ripple current and the vertical axis indicates the peak value of the ripple current (assumed to be sinusoidal) that can be caused to flow in the secondary battery 10 under the constraint of the voltage $\Delta V$. Note that a case is shown by way of example, in which the voltage $\Delta V$ equals 0.5V, and the temperature T of the secondary battery 10 equals −30° C. (extremely low temperature).

As shown in FIG. 6, within the frequency range (around 1 kHz), in which the absolute value of the impedance of the secondary battery 10 is relatively small, the electric current that can be caused to flow in the secondary battery 10 increases. When the frequency is low or the electric current is a direct current, it is hardly possible to cause an electric current to flow in the secondary battery 10 to increase the temperature of the secondary battery.

Figure 7:
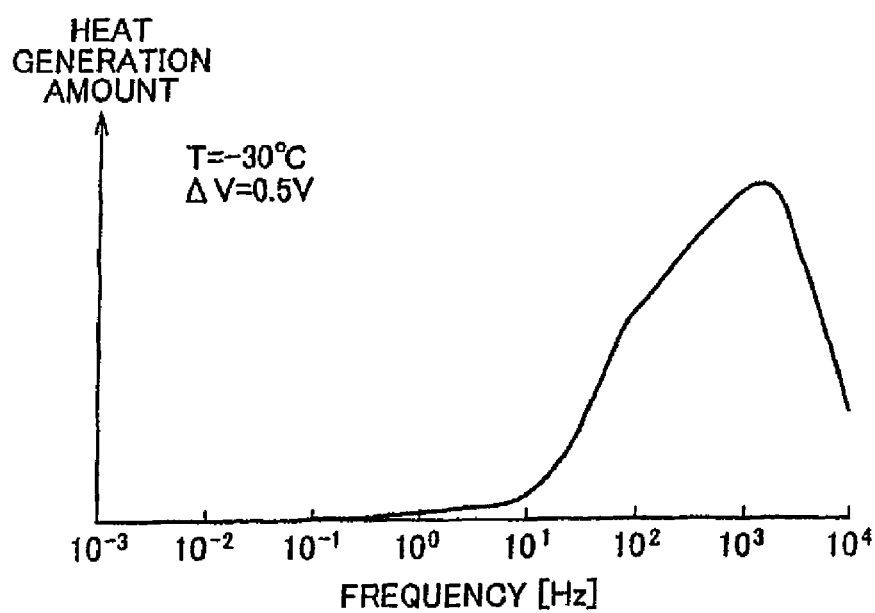
FIG. 7 is a diagram showing an average amount of heat that can be generated in the secondary battery under extremely low temperature conditions, where the voltage generated across the internal resistance of the secondary battery is a constraint.

FIG. 7 is a diagram showing the average amount of heat that can be generated in the secondary battery 10 under extremely low temperature conditions where the voltage $\Delta V$ generated across the internal resistance 12 of the secondary battery 10 is a constraint. Referring to FIG. 7, the horizontal axis indicates the frequency of the ripple current and the vertical axis indicates the average amount of heat generated in the secondary battery 10 in one cycle of the ripple. Note that also in FIG. 7, a case is shown by way of example, in which the voltage ΔV equals 0.5V, and the temperature T of the secondary battery 10 equals −30° C. (extremely low temperature).

As shown in FIG. 7, the amount of heat generated by the secondary battery 10 increases within a frequency range (around 1 kHz), in which the absolute value of the impedance of the secondary battery 10 is relatively low. When the frequency is low or the electric current is a direct current, it is hardly possible to cause an electric current to flow in the secondary battery 10 to increase the temperature of the secondary battery under the constraint, voltage ΔV=0.5 V.

As described above, based on the frequency characteristics of the impedance of the secondary battery 10, the ripple current at a frequency within the range (around 1 kHz, for example), in which the absolute value of the impedance of the secondary battery 10 is relatively low, is caused to flow by the ripple generating section 20. In this way, it is possible to increase the heat generation amount Q of the secondary battery 10 and it is possible to effectively increase the temperature of the secondary battery 10.

Figure 8:
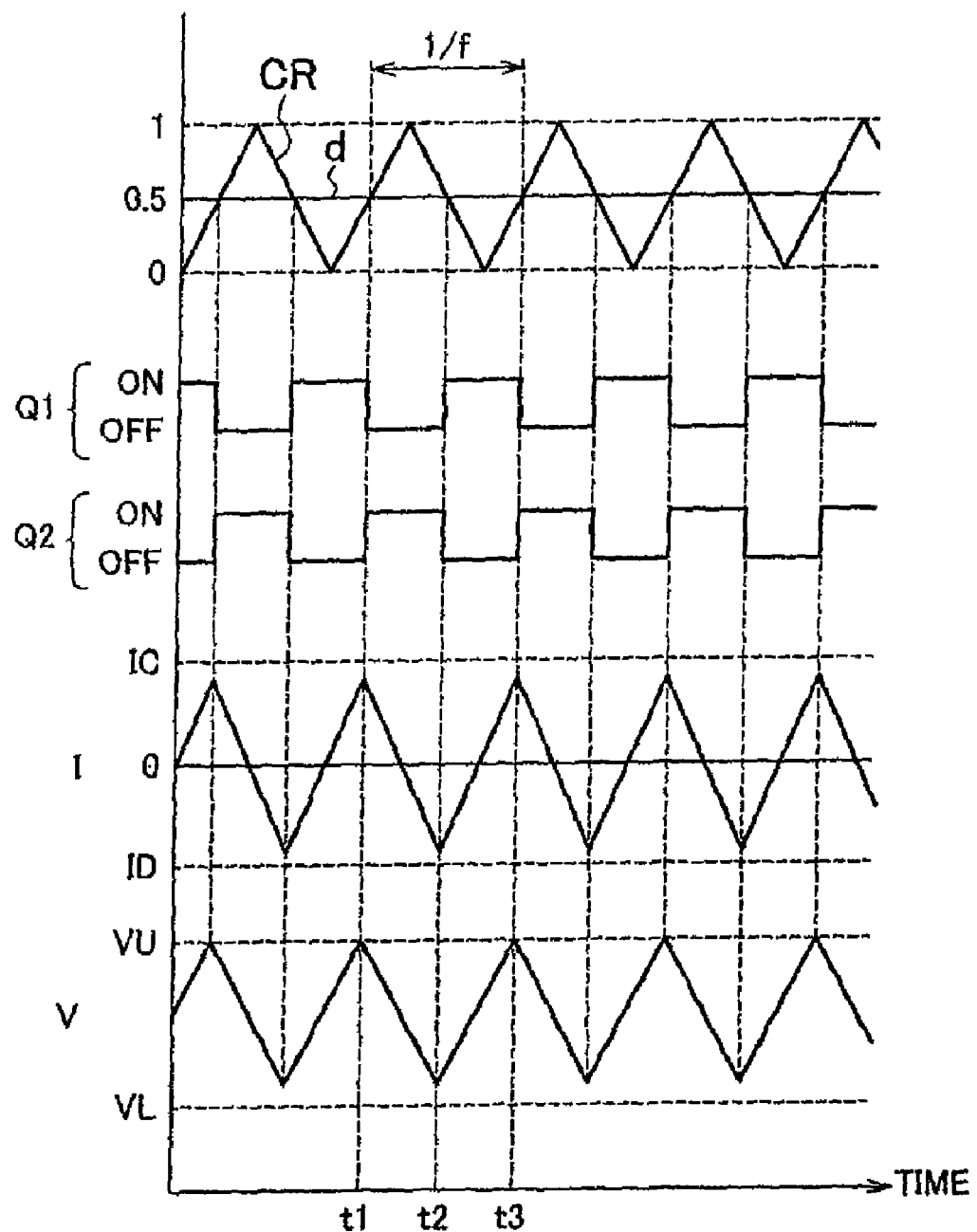
FIG. 8 is a waveform diagram of electric current and voltage in the secondary battery during the ripple temperature increase operation.

FIG. 3 is a waveform diagram of the electric current I and the voltage V in the secondary battery 10 during the ripple temperature increase operation. Referring to FIG. 8, during the ripple temperature increase operation, the frequency of a carrier signal CR of the ripple generating section 20 (boost converter 22) is set to a ripple frequency f (around 1 kHz, for example). When the carrier signal CR exceeds a duty command value d (=0.5) at time t1, the switching device Q1 of the upper arm is turned off and the switching device Q2 of the lower arm is turned on. When this occurs, the electric current I (positive when the battery is being charged) that flows in the secondary battery 10 is reversed and increased in the negative direction. At the timing when the energy stored in the reactor L has been discharged, the sign of the electric current I is turned from positive to negative. The voltage V is reduced.

When the carrier signal CR falls below the duty command value d at time t2, the switching device Q1 of the upper arm is turned on and the switching device Q2 of the lower arm is turned off. Then, the electric current I is reversed and increased in the positive direction. At the timing when the energy stored in the reactor L has been discharged, the sign of the electric current I is turned from negative to positive. The voltage V increases.

When the carrier signal CR again exceeds the duty command value d at time t3, the switching devices Q1 and Q2 are turned off and on, respectively. The electric current I is again reversed and increased in the negative direction and the voltage V is reduced.

In this way, the electric current I and the voltage V vary at the ripple frequency f. In the first embodiment, the target of the ripple current is set so that the ripple current is maximized within the range such that the voltage V does not exceed the upper limit voltage VU nor fall below the lower limit voltage VL and the electric current I exceeds neither the maximum charging electric current IC nor the maximum discharging electric current ID. In addition, the ripple frequency f is adjusted so that the ripple current is brought to the target.

(Temperature Increasing Control of Secondary Battery 10)

Next, the temperature increasing control of the secondary battery 10 that is performed by the ECU 60 will be described.

Figure 9:
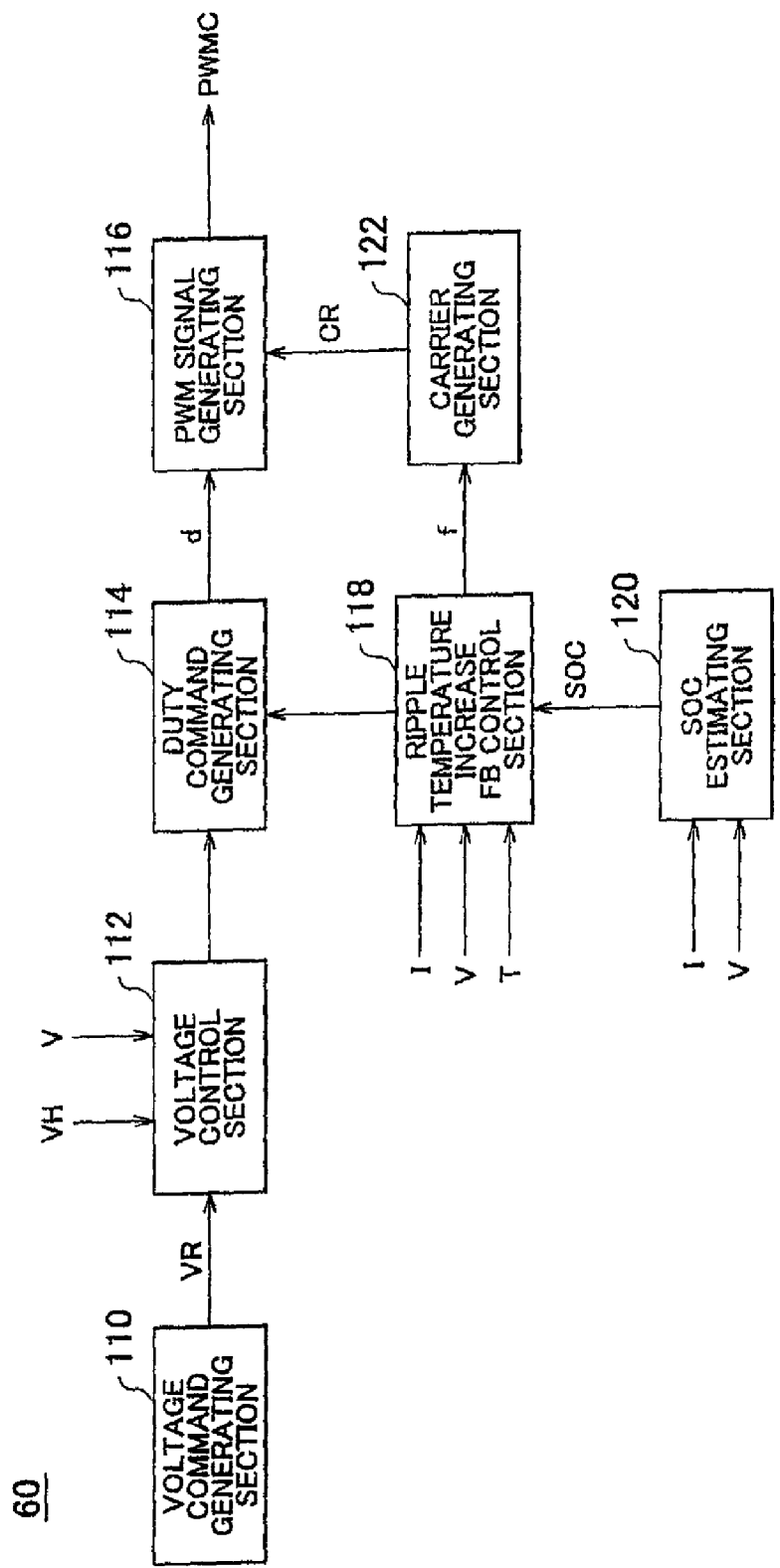
FIG. 9 is a functional block diagram of part of an ECU shown in FIG. 1, the part relating to the control of a boost converter.

FIG. 9 is a functional block diagram of part of the ECU 60 shown in FIG. 1, the part relating to the control of the boost converter 22. Referring to FIG. 9, the ECU 60 includes a voltage command generating section 110, a voltage control section 112, a duty command generating section 114, a PWM signal generating section 116, a ripple temperature increase feed-back (FB) control section 118, a state of charge (SOC) estimating section 120, and a carrier generating section 122.

The voltage command generating section 110 generates a voltage command value VR that is the target value of the voltage VH controlled by the boost converter 22. For example, the voltage command generating section 110 generates a voltage command value VR based on the power of the motor generator 40 calculated from the torque command value and the motor speed of the motor generator 40 (FIG. 1).

The voltage control section 112 receives the voltage command value VR from the voltage command generating section 110 and receives the detected values of the voltages VH and V from the voltage sensors 76 and 74 (FIG. 1), respectively. The voltage control section 112 performs the control operation (proportional integral control, for example) to make the voltage VH equal to the voltage command value VR.

The duty command generating section 114 generates the duty command value d that indicates the switching duty factors of the switching devices Q1 and Q2 (FIG. 1) of the boost converter 22 based on the output for control from the voltage control section 112. When the duty command generating section 114 receives, from the ripple temperature increase FB control section 118, the notification to the effect that the ripple temperature increase operation on the secondary battery 10 should be performed, the duty command generating section 114 sets the duty command value d to a predetermined value (0.5 (boost ratio is 2), for example) for the ripple temperature increase operation, irrespective of the output for control from the voltage control section 112.

The PWM signal generating section 116 compares the duty command value d received from the duty command generating section 114 with the carrier signal CR received from the carrier generating section 122 and generates the control signal PWMC, in which the logical status varies depending on the result of comparison. The PWM signal generating section 116 then outputs the generated control signal PWMC to the switching devices Q1 and Q2 of the boost converter 22.

The ripple temperature increase FB control section 118 receives the detected values of the electric current I, the voltage V, and the temperature T from the electric current sensor 72, the voltage sensor 74, and the temperature sensor 78 (FIG. 1), respectively. The ripple temperature increase FB control section 118 then determines whether to perform the ripple temperature increase operation on the secondary battery 10, based on the detected value of the temperature T and the remaining capacity (hereinafter also referred to as the "SOC (state of charge)" and represented by the value from 0% to 100% where the fully discharged state and the fully charged state are 0% and 100%, respectively) of the secondary battery 10 received from the SOC estimating section 120.

When it is determined that the ripple temperature increase operation should be performed, the ripple temperature increase FB control section 118 sets the ripple frequency f based on the temperature T and the SOC and outputs the ripple frequency f to the carrier generating section 122, and outputs the notification to the effect that the ripple temperature increase operation should be performed, to the duty command generating section 114 and the carrier generating section 122.

In addition, while the ripple temperature increase operation is performed, the ripple temperature increase FB control section 118 adjusts the ripple frequency f so that the voltage V is restricted within the range between the predetermined upper and lower limits (the upper limit voltage VU and the lower limit voltage VL shown in FIG. 8) and the electric current I (ripple current) is brought to the predetermined target, based on the detected values of the electric current I and the voltage V, and the ripple temperature increase FB control section 118 outputs the adjusted ripple frequency f to the carrier generating section 122. The target of the ripple current is, for example, determined in advance at the design phase so that the electric current I is maximized within the range, in which the voltage V does not exceed the upper limit voltage VU nor fall below the lower limit voltage VL (and in which the electric current I exceeds neither the maximum charging electric current IC nor the maximum discharging electric current ID).

The SOC estimating section 120 estimates the SOC of the secondary battery 10 based on the detected values of the electric current I and the voltage V and outputs the estimated values to the ripple temperature increase FB control section 118. Note that various kinds of publicly known methods can be used as the method of estimating the SOC of the secondary battery 10.

The carrier generating section 122 generates the carrier signal CR used to generate the PWM signal in the PWM signal generating section 116 and outputs the generated carrier signal CR to the PWM signal generating section 116. When the carrier generating section 122 receives, from the ripple temperature increase FB control section 118, the ripple frequency f along with the notification to the effect that the ripple temperature increase operation should be performed, the carrier generating section 122 generates the carrier signal CR having the received ripple frequency f and outputs the generated carrier signal CR to the PWM signal generating section 116.

Figure 10:
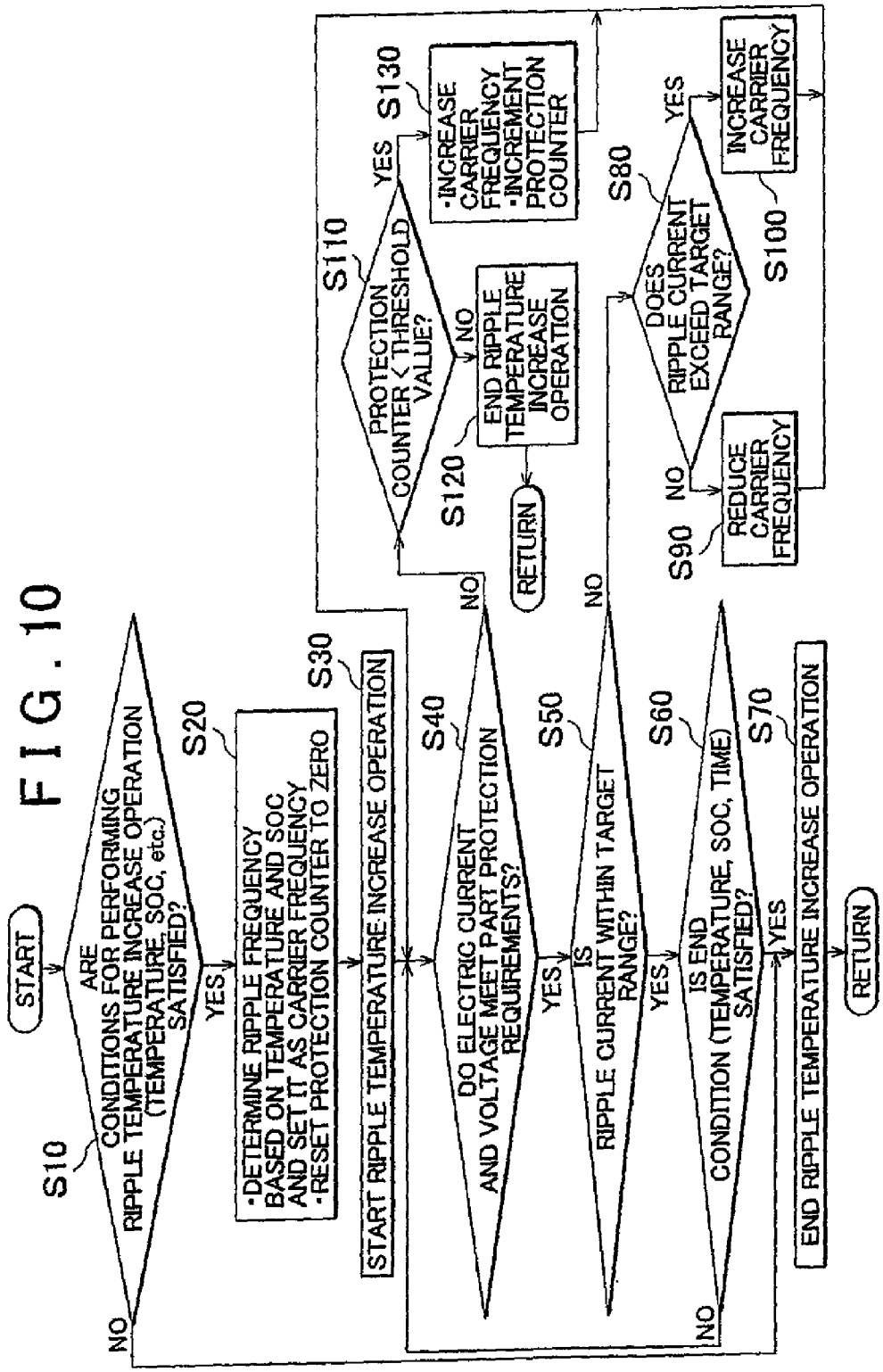
FIG. 10 is a flow chart for explaining a procedure of control of the ripple temperature increase operation performed by the ECU shown in FIG. 1.

FIG. 10 is a flow chart for explaining procedure of control of the ripple temperature increase operation performed by the ECU 60 shown in FIG. 1. The process shown by this flow chart is called by the main routine and executed at fixed intervals or every time predetermined condition(s) are satisfied.

Referring to FIG. 10, the ECU 60 determines whether the conditions for starting the ripple temperature increase operation are satisfied, based on the temperature T and the SOC of the secondary battery 10, etc. (step S10). For example, when the temperature T is an extremely low temperature and the SOC is higher than a predetermined value, it is determined that the conditions for starting the ripple temperature increase operation are satisfied.

When it is determined in step S10 that the starting conditions are not satisfied (NO in step S10), the ECU 60 advances the process to step S70 (described later). When it is determined in step S10 that the starting conditions are satisfied (YES in step S10), the ECU 60 determines the ripple frequency f based on the temperature T and the SOC of the secondary battery 10 with the use of the map prepared in advance etc., and sets the determined ripple frequency f as the carrier frequency of the boost converter 22. In addition, the ECU 60 resets the protection counter to zero (step S20). Note that the protection counter is used as a timer when the voltage and the electric current are out of the part protection requirements, as described later.

Next, the ECU 60 generates the control signal PWMC for performing control to switch on and off the switching devices Q1 and Q2 of the boost converter 22 at the ripple frequency f with the use of the carrier signal having the ripple frequency f. The ECU 60 then outputs the generated control signal PWMC to the switching devices Q1 and Q2 of the boost converter 22, thereby starting the ripple temperature increase operation on the secondary battery 10 with the use of the boost converter 22 (step S30).

Once the ripple temperature increase operation is started, the ECU 60 determines whether the protection requirements set to protect various parts are satisfied, based on the electric current I and the voltage V (step S40). As the protection requirements, for example, the upper and lower limits of the voltage V (to protect the battery cells), the maximum value of the absolute value of the electric current I (to protect the switching devices Q1 and Q2 and/or the reactor L), the maximum value of the square of the electric current I (to protect the system main relay, the bus bar, the battery cells, etc. from abnormal heat generation), etc. are set.

When it is determined in step S40 that the part protection requirements are satisfied (YES in step S40), the ECU 60 determines whether the ripple current generated is within the predetermined target range (step S50). As the predetermined target range, the range is set such that the ripple current is maximized within the range, in which the voltage V does not exceed the upper limit voltage VU nor fall below the lower limit voltage VL and in which the electric current I exceeds neither the maximum charging electric current IC nor the maximum discharging electric current ID.

When it is determined in step S50 that the ripple current is within the target range (YES in step S50), the ECU 60 determines whether the condition for ending the ripple temperature increase operation is satisfied, based on the temperature T and the SOC of the secondary battery 10, the time elapsed since the ripple temperature increase operation was started, etc. (step S60). For example, when the temperature T exceeds a predetermined temperature-increase-operation end temperature, the SOC falls below the tower limit value, or a predetermined period of time has elapsed since the ripple temperature increase operation was started, it is determined that the condition for ending the ripple temperature increase operation is satisfied. When it is determined in step S60 that the end condition is satisfied (YES in step S60), the ECU 60 stops outputting the control signal PWMC to the boost converter 22 and ends the ripple temperature increase operation (step S70). When it is determined in step S60 that the end condition is not satisfied (NO in step S60), the ECU 60 returns the process to step S40.

On the other hand, when it is determined in step S50 that the ripple current is not within the target range (NO in step S50), the ECU 60 determines whether the ripple current exceeds the target range (step S80). When it is determined that the ripple current does not exceed the target range, that is; it is determined that the ripple current falls below the target range (NO in step S80), the ECU 60 reduces the carrier frequency of the boost converter 22 by a predetermined value (step S90). The peak value Ip of the ripple current is expressed by the following equation and is inversely proportional to the carrier frequency fc. Thus, when the carrier frequency fc is reduced, the ripple current increases.

$$Ip = V/L \times 1/(4 \times fc) \quad (4)$$

In this equation, L represents the inductance of the reactor of the boost converter 22 and fc represents the switching frequency (=ripple frequency, carrier frequency) of the boost converter 22.

On the other hand, when it is determined that the ripple current exceeds the target range (YES in step S80), the ECU 60 increases the carrier frequency of the boost converter 22 by a predetermined value (step S100), which reduces the ripple current. After step S90 or step S100, the ECU 60 returns the process to step S40.

When it is determined in step S40 that the above part protection requirements are not satisfied (NO in step S40), the ECU 60 determines whether the protection counter is less than the predetermined threshold value (step S110). When it is determined that the protection counter is less than the threshold value (YES in step S110), the ECU 60 reduces the ripple current by increasing the carrier frequency of the boost converter 22 by a predetermined value and increments the protection counter (step S130). The process is then returned to step S40.

On the other hand, when it is determined in step S110 that the protection counter is equal to or greater than the threshold value (NO in step S110), the ECU 60 stops outputting the control signal PWMC to the boost converter 22 and ends the ripple temperature increase operation (step S120).

As described above, in the first embodiment, the temperature of the secondary battery 10 is increased by controlling the ripple generating section 20 configured to actively cause the ripple current to flow in the secondary battery 10. Even when there is unevenness in the circuit constant of the ripple generating section 20 and the characteristics of the secondary battery 10, it is possible to generate the maximum ripple current within the range, in which the voltage of the secondary battery 10 is restricted between the predetermined upper and lower limits because the ripple frequency f is adjusted so that the ripple current is brought to a predetermined target, or maximized, while the voltage of the secondary battery 10 is restricted between the predetermined upper and lower limits. Thus, according to the first embodiment, the target amount of heat is efficiently generated within the range, in which the voltage of the secondary battery 10 does not exceed the upper limit voltage nor fall below the lower limit voltage.

(Second Embodiment)

In the above first embodiment, the ripple current is controlled to be brought to the target by changing the carrier frequency (ripple frequency) of the boost converter 22. In a second embodiment, the ripple current is controlled by adjusting the boost ratio of the boost converter 22 (that is, by adjusting the switching duty factors of the switching devices Q1 and Q2).

An overall configuration of an electric vehicle, in which a secondary battery temperature-increasing control apparatus according to the second embodiment is used, is the same as that of the electric vehicle 100 shown in FIG. 1.

Figure 11:
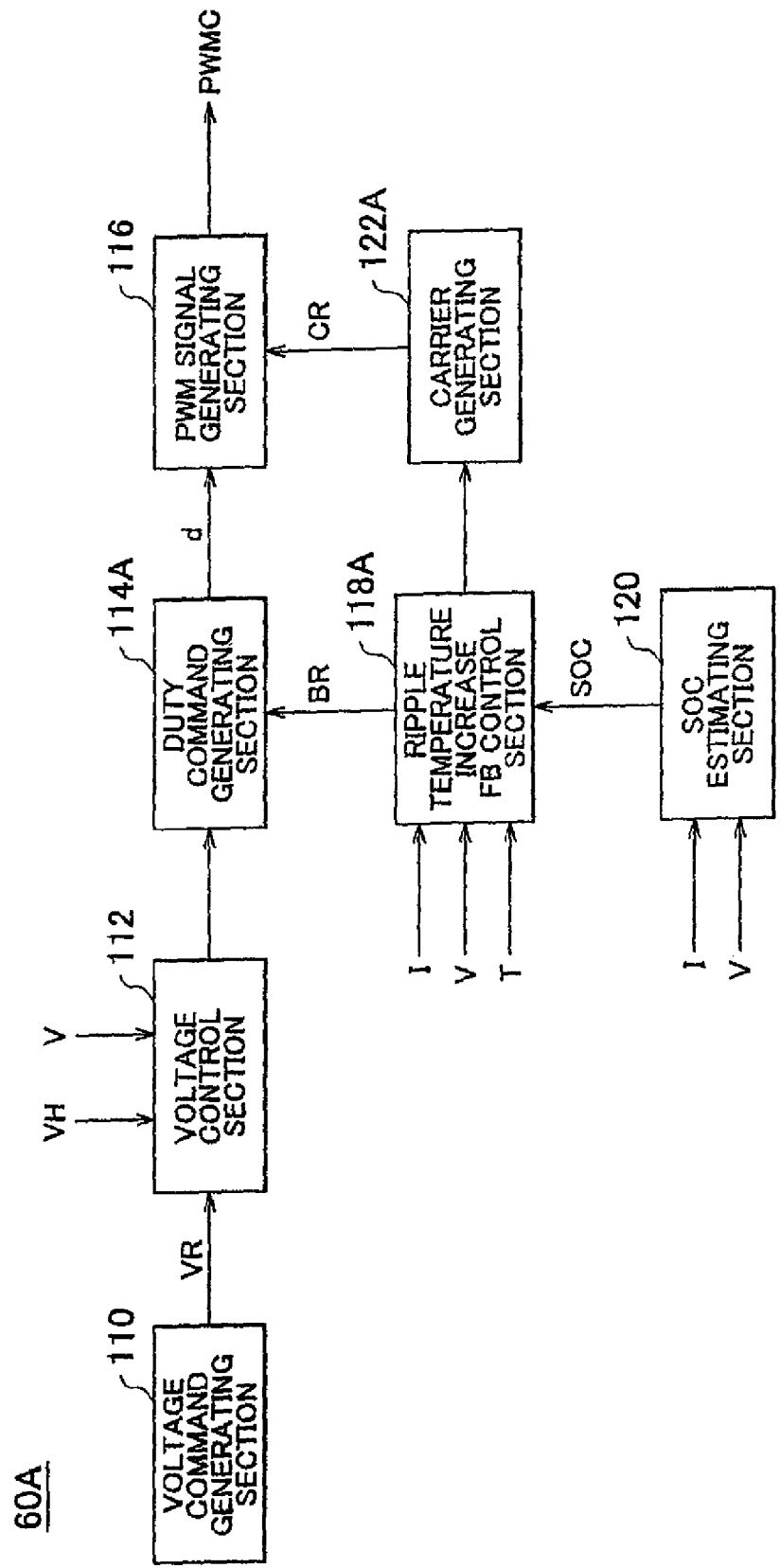
FIG. 11 is a functional block diagram of part of an ECU according to a second embodiment, the part relating to the control of the boost converter.

FIG. 11 is a functional block diagram of part of the ECU 60A of the second embodiment, the part relating to the control of the boost converter 22. Referring to FIG. 11, the ECU 60A includes a duty command generating section 114A, a ripple temperature increase FB control section 118A, and a carrier generating section 122A, instead of the duty command generating section 114, the ripple temperature increase FB control section 118, and the carrier generating section 122 of the ECU 60 shown in FIG. 9.

When it is determined that the ripple temperature increase operation should be performed, the ripple temperature increase FB control section 118A sets the boost ratio BR of the boost converter 22 based on the temperature T and the SOC and outputs the boost ratio BR to the duty command generating section 114A, and outputs the notification to the effect that the ripple temperature increase operation should be performed, to the duty command generating section 114A and the carrier generating section 122A. Note that the boost ratio BR at this point may be a fixed value (2, for example).

While the ripple temperature increase operation is performed, the ripple temperature increase FB control section 118A adjusts the boost ratio BR so that the electric current I (ripple current) is brought to a predetermined target while the voltage V is restricted between the predetermined upper and lower limits, based on the detected values of the electric current I and the voltage V, and the ripple temperature increase FB control section 118A outputs the adjusted boost ratio BR to the duty command generating section 114A.

Note that the ripple temperature increase FB control section 118A is the same as the ripple temperature increase FB control section 118 of the first embodiment shown in FIG. 9, except the above.

When the duty command generating section 114A receives, from the ripple temperature increase FB control section 118A, the notification to the effect that the ripple temperature increase operation on the secondary battery 10 should be performed, the duty command generating section 114A generates the duty command value d based on the boost ratio BR received from the ripple temperature increase FB control section 118A, irrespective of the output for control from the voltage control section 112.

Note that the duty command generating section 114A is the same as the duty command generating section 114 of the first embodiment shown in FIG. 9, except the above.

When the carrier generating section 122A receives, from the ripple temperature increase FR control section 118A, the notification to the effect that the ripple temperature increase operation on the secondary battery 10 should be performed, the carrier generating section 122A generates the carrier signal CR having the predetermined ripple frequency f and outputs the generated carrier signal CR to the PWM signal generating section 116.

Note that the carrier generating section 122A is the same as the carrier generating section 122 of the first embodiment shown in FIG. 9, except the above.

In this ECU 60A, while the ripple temperature increase operation is performed, the boost ratio BR of the boost converter 22 is adjusted by the ripple temperature increase FB control section 118A so that the electric current I (ripple current) is bought to the predetermined target while the voltage V is restricted between the predetermined upper and lower limits. Then, the duty command value d is generate by the duty command generating section 114A according to the boost ratio BR generated by the ripple temperature increase FB control section 118A. The carrier generating section 122A generates the carrier signal CR having the predetermined ripple frequency f while the ripple temperature increase operation is performed.

Figure 12:
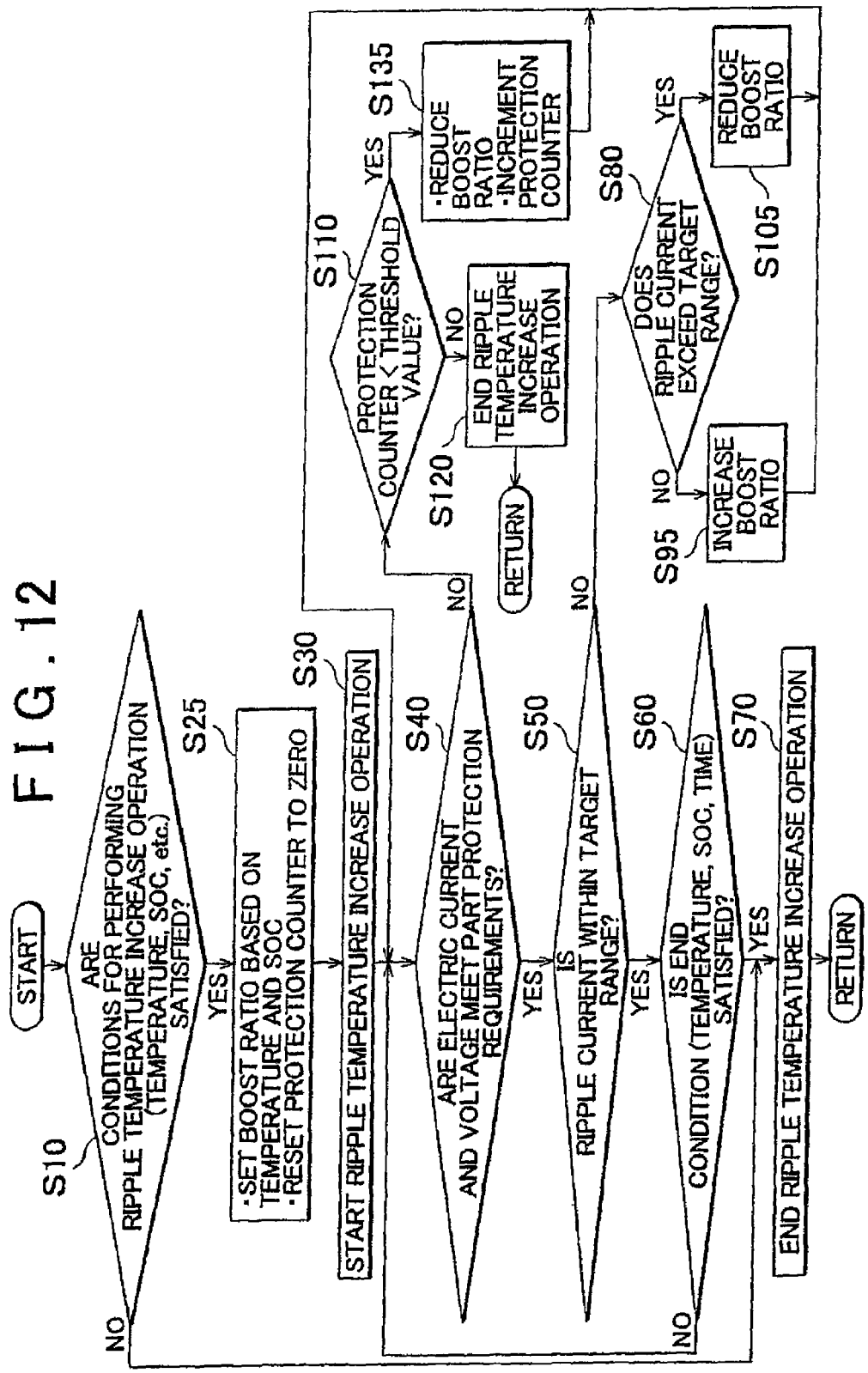
FIG. 12 is a flow chart for explaining a procedure of control of the ripple temperature increase operation performed by the ECU according to the second embodiment.

FIG. 12 is a flow chart for explaining a procedure of the ripple temperature increase operation performed by the ECU 60A of the second embodiment. The process shown by this flow chart is also called by the main routine and executed at fixed intervals or every time predetermined conditions are satisfied.

Referring to FIG. 12, the flow chart includes steps S25, S95, S105, and S135, instead of steps S20, S90, S100, and S130, respectively, of the flow chart shown in FIG. 10.

Specifically, when it is determined in step S10 that the conditions for starting the ripple temperature increase operation are satisfied (YES in step S10), the ECU 60A sets the boost ratio of the boost converter 22 (FIG. 1) based on the temperature T and the SOC of the secondary battery 10 with the use of the map prepared in advance etc. and resets the protection counter to zero (step S25).

When it is determined in step S80 that the ripple current does not exceed the target range, that is, the ripple current falls below the target range (NO in step S80), the ECU 60A increases the boost ratio of the boost converter 22 by a predetermined value (step S95). Increasing the boost ratio results in an increase in the ripple current.

On the other hand, when it is determined in step S80 that the ripple current exceeds the target range (YES in step S80), the ECU 60A reduces the boost ratio of the boost converter 22 by a predetermined value (step S105). Reducing the boost ratio results in a decrease in the ripple current.

When it is determined in step S110 that the protection counter is less than the predetermined threshold value (YES in step S110), the ECU 60A reduces the ripple current by reducing the boost ratio of the boost converter 22 by a predetermined value and increments the protection counter (step S135). The process is then returned to step S40.

As described above, in the second embodiment, the boost ratio BR of the boost converter 22, which is a component of the ripple generating section 20, is adjusted so that the ripple current is brought to the predetermined target, or maximized, while the voltage of the secondary battery 10 is restricted between the predetermined upper and lower limits, so that it is possible to generate the maximum ripple current within the range, in which the voltage of the secondary battery 10 is restricted between the predetermined upper and lower limits. Thus, also with the second embodiment, the target amount of heat is efficiently generated within the range, in which the voltage of the secondary battery 10 does not exceed the upper limit voltage nor fall below the lower limit voltage.

Note that although in the first embodiment, the manipulated value to control the ripple current is the carrier frequency and in the second embodiment, the manipulated value to control the ripple current is the boost ratio (or the switching duty factors of the switching devices Q1 and Q2), both of the carrier frequency and the boost ratio may be the manipulated values, where the first and second embodiments are combined.

In the above embodiments, the electric vehicle 100 may be an electric vehicle, in which the motor generator 40 is the only drive power source or may be a hybrid vehicle, on which an engine is additionally mounted as the drive power source. In addition, the electric vehicle 100 may be a fuel cell vehicle, on which a fuel cell in addition to the secondary battery 10 is mounted as the direct-current power source.

The electric current sensor 72 is an example of the "electric current detecting section" of the invention. The voltage sensor 74 is an example of the "voltage detecting section" of the invention. The ripple temperature increase FB control sections 118, 118A are an example of the "feed back control section" of the invention. The boost converter 22 is an example of the "booster" of the invention. The temperature sensor 78 is an example of the "temperature detecting section" of the invention. The SOC estimating section 120 is an example of the "SOC estimating section" of the invention.

It should be understood that the embodiments described above are for illustration purpose only and not intended to be restrictive. The scope of the invention is defined not by the above description of the embodiments but by the claims and it is intended to include all modifications within the scope of the claims and the equivalent thereof.

The invention claimed is:

1. A secondary battery temperature-increasing control apparatus, comprising:
    a ripple generating section configured to cause a ripple current to flow in a secondary battery to increase a temperature of the secondary battery; and
    a feed back control section that controls the ripple generating section so that the ripple current is brought to a predetermined target, wherein:
    the predetermined target is set so that the ripple current is maximized with a range such that a voltage of the secondary battery does not exceed an upper limit voltage nor fall below a lower limit voltage and an electric current flowing in the secondary battery exceeds neither a maximum charging electric current nor a maximum discharging electric current;
    when the ripple current is less than the target, the feed back control section controls the ripple generating section so that a frequency of the ripple current is reduced; and
    when the ripple current is greater than the target, the feed back control section controls the ripple generating section so that the frequency of the ripple current is increased.

2. The secondary battery temperature-increasing control apparatus according to claim 1, wherein:
    the ripple generating section includes a chopper-type booster configured to be capable of boosting an output voltage of the booster to or above the voltage of the secondary battery;
    the feed back control section reduces a carrier frequency of the booster when the ripple current is less than the target; and
    the feed back control section increases the carrier frequency of the booster when the ripple current is greater than the target.

3. A secondary battery temperature-increasing control apparatus, comprising:
    a ripple generating section configured to cause a ripple current to flow in a secondary battery to increase a temperature of the secondary battery; and
    a feed back control section that controls the ripple generating section so that the ripple current is brought to a predetermined target, wherein:
    the predetermined target is set so that the ripple current is maximized within a range such that a voltage of the secondary battery does not exceed an upper limit voltage nor fall below a lower limit voltage and an electric current flowing in the secondary battery exceeds neither a maximum charging electric current nor a maximum discharging electric current;
    the ripple generating section includes a chopper-type booster configured to be capable of boosting an output voltage of the booster to or above the voltage of the secondary battery;
    the feed back control section increases a boost ratio of the booster when the ripple current is less than the target; and
    the feed back control section reduces the boost ratio of the booster when the ripple current is greater than the target.

4. The secondary battery temperature-increasing control apparatus according to claim 1, further comprising a temperature detecting section that detects the temperature of the secondary battery and a state of charge (SOC) estimating section that estimates an SOC of the secondary battery,
    wherein the feed back control section stops controlling the ripple generating section when the temperature detected by the temperature detecting section reaches a first predetermined value or when the SOC estimated by the SOC estimating section reaches a second predetermined value.

5. A vehicle comprising:
    a secondary battery that stores electric power for driving the vehicle; and
    the secondary battery temperature-increasing control apparatus according to claim 1.

6. A secondary battery temperature-increasing control method of increasing a temperature of a secondary battery by controlling a ripple generating section configured to cause a ripple current to flow in the secondary battery, the secondary battery temperature-increasing control method comprising:

determining whether the ripple current has been brought to a predetermined target, wherein the predetermined target is set so that the ripple current is maximized within a range such that a voltage of the secondary battery does not exceed an upper limit voltage nor fall below a lower limit voltage and an electric current flowing in the secondary battery exceeds neither a maximum charging electric current nor a maximum discharging electric current, and the secondary battery temperature-increasing control method further comprises:

when it is determined that the ripple current has not been brought to the target, determining whether the ripple current is greater than or less than the target;

when it is determined that the ripple current is less than the target, controlling the ripple generating section so that a frequency of the ripple current is reduced; and when it is determined that the ripple current is greater than the target, controlling the ripple generating section so that the frequency of the ripple current is increased.

7. The secondary battery temperature-increasing control apparatus according to claim 1, further comprising:

an electric current detecting section that detects the electric current charging or discharging the secondary battery; and a voltage detecting section that detects the voltage of the secondary battery.

8. The secondary battery temperature-increasing control apparatus according to claim 3, further comprising:

an electric current detecting section that detects the electric current charging or discharging the secondary battery; and a voltage detecting section that detects the voltage of the secondary battery.

9. The secondary battery temperature-increasing control apparatus according to claim 3, further comprising a temperature detecting section that detects the temperature of the secondary battery and a state of charge (SOC) estimating section that estimates an SOC of the secondary battery, wherein the feed back control section stops controlling the ripple generating section when the temperature detected by the temperature detecting section reaches a first predetermined value or when the SOC estimated by the SOC estimating section reaches a second predetermined value.

10. A vehicle comprising:

a secondary battery that stores electric power for driving the vehicle; and the secondary battery temperature-increasing control apparatus according to claim 3.

* * * * *